United States Patent
Riggs et al.

[11] 3,756,632
[45] Sept. 4, 1973

[54] COUPLING APPARATUS FOR PIPE
[75] Inventors: Jerry W. Riggs; Roy E. Stiner, both of Tulsa, Okla.
[73] Assignee: Continental Industries, Tulsa, Okla.
[22] Filed: Nov. 10, 1971
[21] Appl. No.: 197,309

[52] U.S. Cl............................. 285/250, 285/356
[51] Int. Cl............................................ F16l 33/00
[58] Field of Search................ 285/356, 250, 334.5, 285/354, 52

[56] References Cited
UNITED STATES PATENTS
| 2,300,584 | 11/1942 | Martin | 285/356 X |
| 2,950,928 | 8/1960 | Bowan | 285/348 X |
| 2,413,089 | 12/1946 | Vaught | 285/334.5 X |
| 2,364,447 | 12/1944 | Hynes | 285/356 X |
| 2,167,258 | 7/1939 | Wilson | 285/250 |

FOREIGN PATENTS OR APPLICATIONS
| 218,472 | 3/1958 | Australia | 285/250 |
| 69,073 | 5/1941 | Czechoslovakia | 285/354 |

Primary Examiner—Dave W. Arola
Attorney—James R. Head and Paul H. Johnson

[57] ABSTRACT

This invention relates to a coupling apparatus for pipe, such as a valve, meter riser, tee fitting, or the like. The apparatus is characterized by a body portion having provision therein for the insertion of a length of pipe having a rigid insert positioned therein with an exposed flange extending therefrom, in conjunction with a rigid tubular collar, a compression ring and a tightening nut which is threadably connected to the body portion for the compression of the compression ring against the collar to apply compressive pressure on the pipe in an arrangement such that pull on the pipe is applied to the collar and thence to the compression ring applying increased compression on the ring.

1 Claim, 3 Drawing Figures

PATENTED SEP 4 1973 3,756,632

COUPLING APPARATUS FOR PIPE

SUMMARY OF THE INVENTION

Coupling apparatus are widely utilized in the gas and water industry. One form of coupling apparatus is that required to provide a connection of a length of pipe, for example, polyethylene or polyvinylchloride plastic pipe or metal pipe, with a metallic member, such as a valve, meter riser, tee fitting, a length of metal pipe, or the like.

A common problem with connectors of this type is that of gripping the pipe sufficiently to prevent it from being pulled out of the connector. This invention provides an improved means of gripping pipe in a connector, and most significantly, an improved means of increasing the gripping force in proportion to the amount of pull exerted on the pipe.

OBJECTS OF THE INVENTION

A basic object of this invention is to provide an improved coupling for pipe.

A more specific object of the invention is to provide a coupling for attaching pipe to a metal device including means wherein the gripping force applied to the pipe increases as force is applied to pull the pipe out of the coupling.

These and other objects will be fulfilled in the apparatus set forth in the following description and claims, taken in conjunction with the attached drawings.

DESCRIPTION OF THE VIEWS

DETAILED DESCRIPTION

Figure 1:
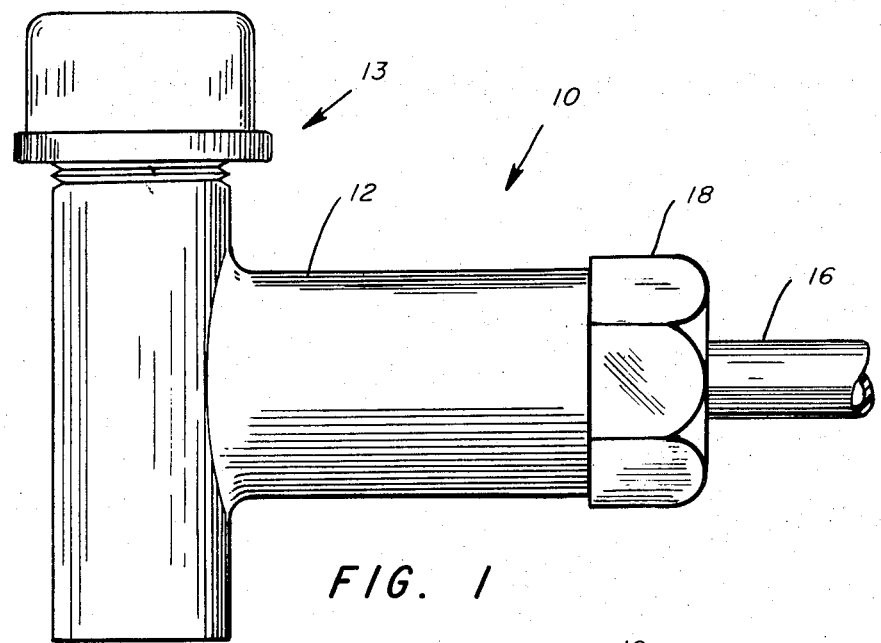
FIG. 1 is a side view of an embodiment of the coupling apparatus of the invention, forming, as an example, a portion of a tee fitting, the coupling being used to attach a length of pipe.
Figure 2:
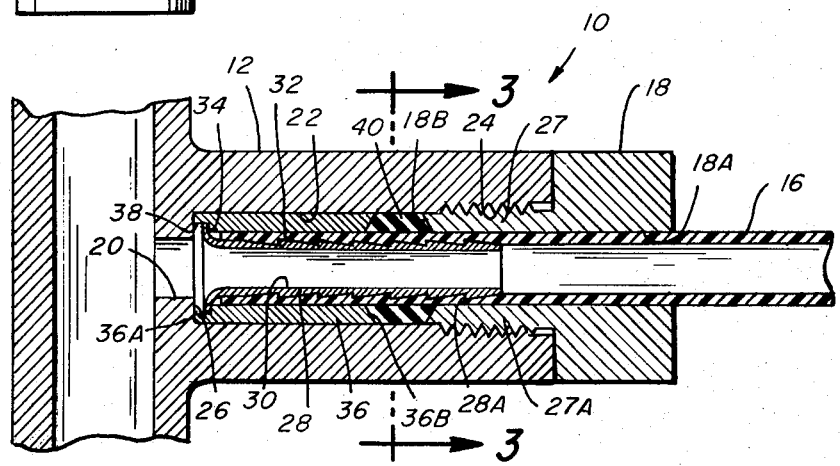
FIG. 2 is a partial cross-sectional view of the tee fitting of FIG. 1, showing the coupling apparatus of this invention in greater detail.
Figure 3:
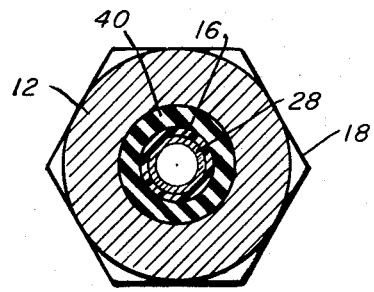
FIG. 3 is a cross-sectional view taken along the line 3—3 of FIG. 2.

Referring now to the drawings, the coupling apparatus of this invention is indicated generally by the numeral 10. The coupling apparatus includes a body portion 12, which, by way of example, is shown to be part of a tee fitting 13, it being understood that body portion 12 may be in many different forms. The coupling apparatus may be used to couple metal or plastic pipe and will be described, by way of example, as used to couple plastic pipe. A length of plastic pipe 16 extends within body 12 through the bore 18A in a tightening nut 18.

Body 12 has a first axial bore 20 extending from one end thereof and communicating with the other portions of tee fitting 13. The opposite end of body 12 has a larger diameter bore 22, coaxial with bore 20. A portion of the bore 22 is provided with internal threads at 24. Bore 22 meets with coaxial bore 20 to form an internal flange surface 26.

Tightening nut 18 includes an integral, reduced diameter tubular portion 27 having external threads 27A thereon, which, when the coupling apparatus is assembled, engages body internal threads 24.

Positioned in the end portion of pipe 16 is a rigid insert 28 having an axial bore 30 therethrough. The outer circumferential surface 32 of the insert is of a diameter to slidably but snugly fit the interior diameter of pipe 16. In addition, the outer surface 32 of insert 28 is preferably provided with serrations 28A to improve the gripping effect on the interior of pipe 16.

Insert 28 is flared at the forward end to an outside diameter exceeding the diameter of pipe 16, the flared portion being indicated by the numeral 34.

Received about pipe 16 within the bore 22 is a collar member 36. The outside diameter of collar 36 is slightly less than the internal diameter of bore 22 so that the collar is slidable within bore 22. Collar 36 is less slidable on pipe 16. The forward end 36A of collar 36 is provided with an internal circumferential recess 38 which receives the insert flared portion 34.

Received on the exterior of pipe 16 within body 12 is a compression ring 40 of resilient material. Like collar 36, the outside diameter of the compression ring 40 is of a dimension to be slidable within bore 22 and the interior diameter to be slidable upon pipe 16, but with a snug fit. The compression ring is engaged by the collar rearward end 36B on the one hand and the tightening nut forward end 18B on the other. As tightening nut 18 is threadably advanced, compression ring is squeezed against collar 36, distorting the compression ring into engagement with the exterior of pipe 16.

ASSEMBLY AND APPLICATION OF THE DEVICE

When the device is to be used to connect a length of plastic pipe 16 to the tee fitting 13 or any other object of which body portion 12 forms a part, the end of the pipe to be connected first receives nut 18. Next, the compression ring 40 is slid upon pipe 16 followed by collar 36. Insert 28 then is positioned in the end of the pipe 16 so that the flange portion 30A is immediately adjacent the end of the pipe.

The end of pipe 16 having insert 28 therein and having collar 36 and compression ring 40 thereon is inserted into the body bore 22 so that the forward end 36A of collar 36 engages the flange surface 26. The tightening nut tubular portion 27 is inserted into bore 22 and the threads 27A thereon engages internal threads 24. Tightening nut 18 is then rotated so that forward end 18A engages compression ring 40. Further rotational advancement of the locking nut compresses the compression ring against collar 36 to distort the compression ring into positive engagement with the exterior of pipe 16. The insert 28 within pipe 16 prevents it from collapsing so that a positive leakproof engagement is obtained between the nipple 12 and pipe 16.

An important advantage of the coupling of this invention is the provision of means wherein as pull is exerted on pipe 16, the compressive force applied against the pipe by compression ring 40 is increased. This is accomplished in this manner: as pull is exerted on pipe 16 it is transmitted by way of the flared portion 34 of insert 28 to collar 36 which is slidable within the body and the force exerted on the collar is directly applied against compression ring 40, increasing the compressive distortion thereof into increased engagement with pipe 16. Thus, the coupling apparatus has a self-energizing compression fitting responsive to pull exerted on pipe 16. The increased compressive force is not applied in such a way as to cut into the pipe or militate against the inherent strength of the pipe.

The invention has been described as it is particularly applied when pipe 16 is of plastic. The device may be used with other types of pipe, such as copper, steel, or other metal. When used with metal pipe the insert 28 is not required, and instead, the pipe is integrally flared on the end to provide flared portion 34. The coupling functions in the same self-energizing way to impose increased compressive distortion of the compression ring 40 as pull is extorted on the pipe. The term "pipe" includes tubing and conduit.

While the invention has been described with a certain degree of particularity it is manifest that many changes may be made in the details of construction and the arrangement of components without departing from the spirit and scope of this disclosure. It is understood that the invention is not limited to the illustrated embodiments set forth herein for purposes of exemplification, but is to be limited only by the scope of the attached claim or claims, including the full range of equivalency to which each element or step thereof is entitled.

What is claimed:

1. A coupling apparatus for a plastic pipe, comprising:
    a body having a first axial bore in one end of a diameter approximately the inside diameter of the pipe, and a second axial bore on the other end of a diameter greater than the outside diameter of the pipe, the first and second axial bores being coaxial and meeting to form an internal flange;
    a rigid insert having an axial bore therethrough, the outer circumferential surface of which is the approximate diameter of the inside diameter of the pipe, the insert being positioned within the end of the pipe, and the insert having a flare end thereon exposed at the end of the pipe, the pipe having the insert therein being positioned within the body second bore so that the flared end of said insert butts with said internal flange;
    a rigid tubular collar having an inside diameter approximately the outside diameter of the pipe and an outside diameter approximately that of the second axial bore of the body, the collar being positioned about the pipe within the body second bore, one end of the collar having a recess therein receiving the flared end of the insert, the collar being slidable relative to the body and the pipe;
    a compression ring of resilient material having an inside and outside diameter dimensionally similar to said collar and positioned about the pipe within the body second bore, one end of the compression ring abutting the other end of said collar; and
    a tightening nut having an externally threaded portion received by the internally threaded second axial bore of said body, the tightening nut having an axial bore receiving the pipe, the end of the portion within said body second bore engaging said compression ring whereby tightening said nut within said body causes the compression ring to securely engage the pipe and whereby pull on the pipe exerts pull on said insert and thereby on to said collar to apply increased compression force on said compression ring.

* * * * *